(12) United States Patent
Shipley et al.

(10) Patent No.: US 6,907,345 B2
(45) Date of Patent: Jun. 14, 2005

(54) MULTI-SCALE VIEW NAVIGATION SYSTEM, METHOD AND MEDIUM EMBODYING THE SAME

(75) Inventors: Christopher E. Shipley, Brentwood, NH (US); Yegeni Berezovsky, Lowell, MA (US)

(73) Assignee: Maptech, Inc., Amesbury, MA (US)

( * ) Notice: Subject to any disclaimer, the term of this patent is extended or adjusted under 35 U.S.C. 154(b) by 0 days.

(21) Appl. No.: 10/104,717

(22) Filed: Mar. 22, 2002

(65) Prior Publication Data

US 2004/0204849 A1 Oct. 14, 2004

(51) Int. Cl.[7] .............................................. G01C 21/00
(52) U.S. Cl. ...................................... 701/212; 701/200
(58) Field of Search ................................ 701/200, 211, 701/212

(56) References Cited

U.S. PATENT DOCUMENTS 4,876,651 A * 10/1989 Dawson et al. ............. 701/200
6,144,920 A * 11/2000 Mikame ...................... 701/212
6,336,073 B1 * 1/2002 Ihara et al. .................. 701/202

* cited by examiner

Primary Examiner—Yonel Beaulieu
(74) Attorney, Agent, or Firm—Mayer Brown Rowe & Maw LLP

(57) ABSTRACT

A system and method for displaying a chart or map such that the area in close proximity to an area of interest is in greater scale than an area that is distant and creating the image dynamically. The method includes a projection function capable of creating or reading reduced scale cache images and displaying those images concurrently with full detail source chart images. The system includes hardware such as a processor, a memory storage device, a drive, a input device among others, and software such as a navigational software program, cache images, and a projection function among other things to produce a spherical view of a displayed electronic chart

11 Claims, 7 Drawing Sheets

MULTI-SCALE VIEW NAVIGATION SYSTEM, METHOD AND MEDIUM EMBODYING THE SAME

BACKGROUND OF THE INVENTION

1. Field of the Invention

The present invention relates generally to mobile electronics, and more particularly, to a navigation system capable of displaying a chart or map such that the area in close proximity to an area of interest is in greater scale than an area that is distant.

2. Description of the Background Art

Various types of navigation systems and methods which have been applied to route guidance systems of boats, vehicles and airplanes on water, land, or in the air or to portable navigating apparatuses and methods have been used and are well known in the art.

A common shortcoming of these systems is that the screen on which maps or charts are displayed only display either short-term planning information by zooming in on a specific location or long-term route/chart planning information by zooming out and viewing a greater area. Thus, in prior navigation systems, to view a "big picture" of a route, the user must zoom out, losing important details about the area immediately surrounding the user. This is shown in FIGS. 1 and 2 (long term) and FIGS. 4 and 5 (short term). In addition, because nautical charts tend to be quite large, and computer screens tend to be quite small, it is often difficult to determine where you are on a chart because only a small portion of the chart can be viewed on any usable scale. These same difficulties are present in other map and chart types.

Historically, the "big picture" view is generated by zooming out (viewing the same chart at a reduced level of zoom) or loading a chart of a smaller scale (displaying a chart which covers a wider area), as shown in FIGS. 1 and 2. When a chart is zoomed out, the user is able to view more of the chart, but the details become increasingly difficult to read. Important navigational information can become so difficult to read that it is virtually useless. Further, when loading charts of smaller scale, details that are important for short term navigation are often left out of small scale charts in order to reduce the general clutter of the chart while attempting to show those features that are considered most important at that scale.

On a traditional electronic chart, if an object is 100 pixels from the user on the chart and 1 mile from the user in reality, then an object 200 pixels from the user on the chart will be approximately 2 miles from the user in reality. This function of distance from the user on a chart to distance from the user in the real world is linear (or it at least matches the chart projection), and can be represented as follows:

Linear
100 pixels=1 mile
200 pixels=2 miles
300 pixels=3 miles
400 pixels=4 miles

SUMMARY OF THE INVENTION

In the present invention, the zoom level/projection of the electronic chart display is modified so that areas of the electronic chart that are further from the user are displayed with less detail than those areas in close proximity to the user, creating a spherical view of a relatively large portion of the chart. The advantage of this system is that much more of the chart can be displayed.

The present invention overcomes the shortcomings discussed above by employing a differential zoom function that decreases the resolution of those areas distant from the area of interest while keeping the areas of importance, namely those in close proximity, at a higher zoom level. Although the details of distant areas cannot be seen, such details of distant areas do not need to be displayed because the distant view is needed only for planning purposes. The invention allows a user to view an area that is distant from the current location in detail for additional planning purposes without changing the display so that the current location cannot be seen on the display. Thus, a single computer screen can display both short-term and long-term navigation information.

In the present invention, the functions used to modify the chart can either be non-continuous or continuous functions. In a non-continuous function, for example, the pixels that are within 100 pixels of the area of interest are displayed at a 1:1 ratio; the pixels more than 100 pixels from the area of interest are displayed using a different function which decreases the scale as the distance gets greater from the area of interest, as shown in FIG. 6. In this particular example, there is little chart distortion around the area of interest. The chart area shown near the area of interest displays normally and the chart area shown far from the user is shown in a slightly spherical configuration, and can be used for longer term navigation purposes.

Theoretically, there are infinite number of substitutions that could be made for this function that will allow for a variety of chart displays. The following are possible functions:

2d
100 pixels=1 mile
200 pixels=2 miles
300 pixels=4 miles
400 pixels=8 miles
...

u*d
100 pixels=1 mile
200 pixels=2 miles
300 pixels=9 miles
400 pixels=16 miles

With each of these reduction functions, as the distance from the center increases, distances between individual pixels as related to the real world increase as well. As you get further from the user, the scale of the chart is smaller. Another aspect of the invention is that if bearings hold true on the original chart (before modification of the display), bearings will hold true in the modified version. In other words, the reduction functions effect apparent distance to objects, not the angle to the object. If you measure an angle of 30 degrees to an object both on the chart, and in the real world (such as on a Mercator Projection) chart, the angle will also be 30 degrees when the chart is shown in the program. Likewise, if an object appears to be directly ahead or put another way, in a straight line from a point of the original chart or visually from the users perspective, it will be directly ahead or straight from the point in the spherical view.

Another aspect of the invention is that if a reduction function is used that has a computable inverse function, pixels can be converted both forward and backward from original chart to the displayed spherical view. This allows distances and latitude/longitude to be computed to or from the display screen.

Another aspect of the invention is that the area of interest to the user need not be centered in the projected view. The area of interest can be located at one end of the screen in such a way, for example, that nothing can be seen rearward of the user's direction of travel, allowing additional details to be seen in front of the direction of travel. In this example, the center of the projection is at one edge of the screen.

Another aspect of the invention is that it is not limited to only one center of the spherical view. The invention can have the start and end of a route displayed at 1:1 while the areas along the route are displayed at a smaller scale. A weighted function based on distance from the start and end could be employed to create a reduced scale view.

DETAILED DESCRIPTION OF THE PREFERRED EMBODIMENTS

While the present invention may be embodied in many different forms, several specific embodiments are discussed herein with the understanding that the present disclosure is to be considered only as an exemplification of the principles of the present invention, and it is not intended to limit the present invention to the embodiments illustrated.

Figure 7:
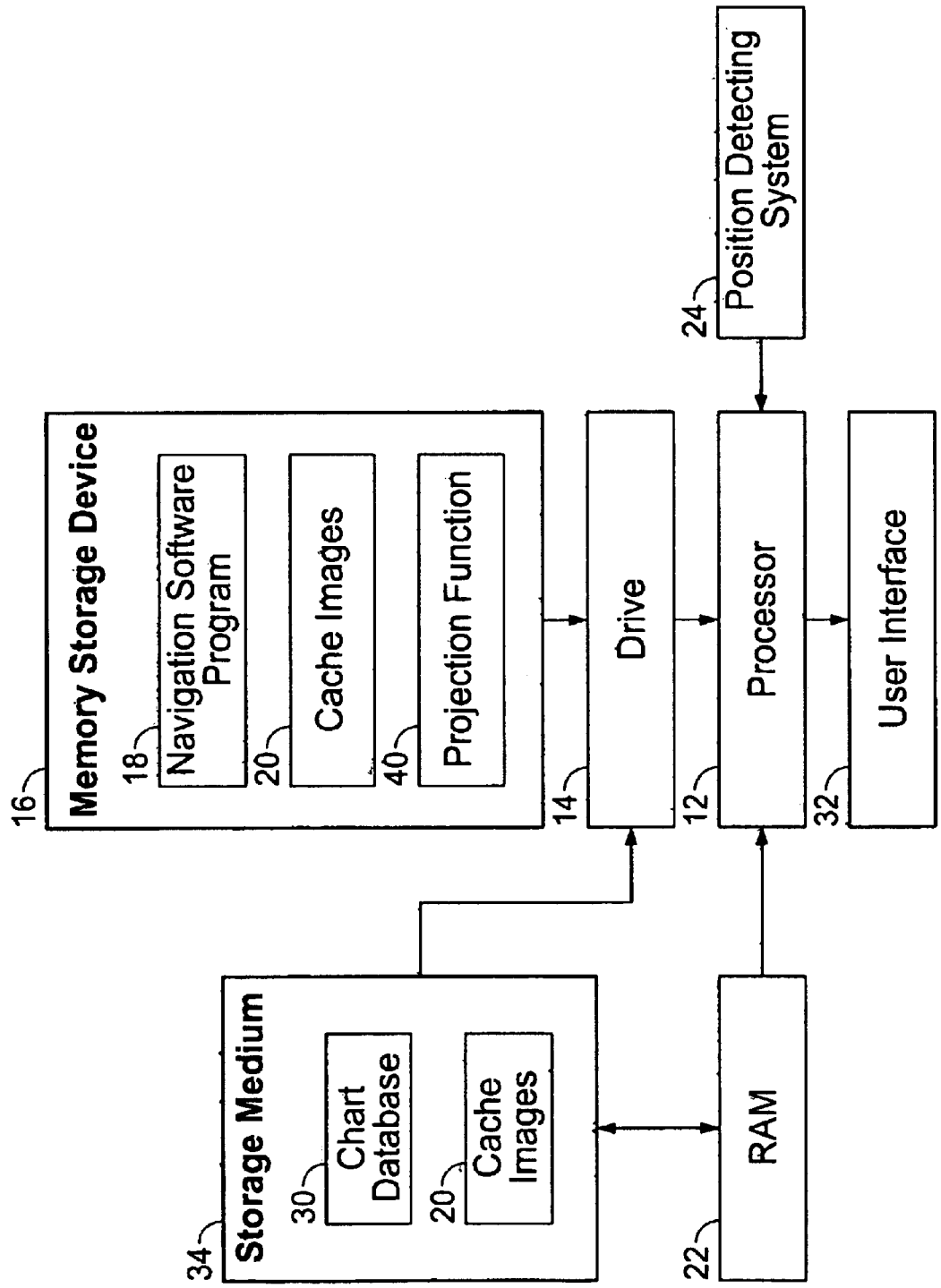
FIG. 7 is a functional block diagram of a comparative example of one of the preferred embodiments.

The preferred embodiment of the invention includes both hardware and software components. Referring to FIG. 7, a block diagram of a navigation system 10 is shown. The navigation system 10 can be installed in a vessel, such as a boat, vehicle or airplane. In alternative embodiments, the navigation system 10 may be implemented as a portable system, or may be implemented on a personal computer (such as a desktop or portable notebook) or a personal digital assistant.

In the embodiment illustrated in FIG. 7, the navigation system 10 includes a processor 12, a drive 14 connected to the processor 12, and a memory storage device 16 for storing a navigation software program 18, cache images 20 and a projection function 40. The processor 12 may be of any type used or known in the art to be suitable for such applications or processors that may be developed in the future.

The navigation system 10 also includes a user interface 32. The user interface 32 may include a display, speakers, or other means to relay information back to the user, referred to herein as a screen or display unit. The user interface 32 may also include at least one device that allows the user to input information into the navigation system 10. The equipment used to input information into the navigation system 10 may include a touch screen, a mouse, a touchpad, a keyboard, a microphone for voice activation as well as the appropriate software for each input device.

The navigation system 10 uses a chart database 30 having source chart data and may optionally include preloaded cache images 20, stored on a storage medium 34. The storage medium 34 is installed in the drive 14 so that the chart database 30 can be read and used in the navigation system 10. The storage medium 34 may be removable and replaceable so that a storage medium with an appropriate chart database 30 for the geographic locality may be used or so that it is easily updated.

In one embodiment, the storage medium 34 is a CD-ROM disc. Various other storage media may be used, including fixed or hard disks, DVD (digital video disks), PCMCIA cards or other currently available storage media, as well as storage media that may be developed in the future. The chart database 30, or portions thereof, may also be provided to the navigation system 10 via wireless transmission.

The navigation system 10 may optionally include a position detecting system 24. The position detecting system 24 may utilize global positioning system (GPS) technology or other systems which are known in the art. The position detecting system 24 may include a system to communicate other considerations such as direction or speed of the user. The position detecting system 24 provides position information to the processor 12. The relayed information may be further processed by the navigation software program 18 that is run on the processor 12 to determine the location, direction, speed, etc., of the user.

In one aspect of the preferred embodiment, when the invention includes the position detecting system 24 and the user is in motion, the area of the chart that is near the user (and hence near the center of the projection) requires frequent updating. Other more distant parts of the chart will require less frequent updates (until the user approaches that section of the source chart). Additional efficiency is added by computing a cutoff distance on each update in which the screen chart does not change over a predetermined distance as a result of the user's movement. Employing the computed distance, the system updates only the changed sections of the chart.

Referring again to FIG. 7, the navigation software program 18 is loaded from the memory storage device 16 into a RAM 22 coupled with the processor 12 in order to operate the navigation system 10. The navigation system 10 uses the chart database 30 stored on the storage medium 34, optionally with the position detecting system 24, to provide various navigation features and functions. The navigation software program 18 may include separate applications that provide navigation features and functions, such as route calculation, chart display, user positioning (e.g., chart matching), route guidance (wherein detailed directions are provided for reaching a desired destination), and other functions.

Figure 1:
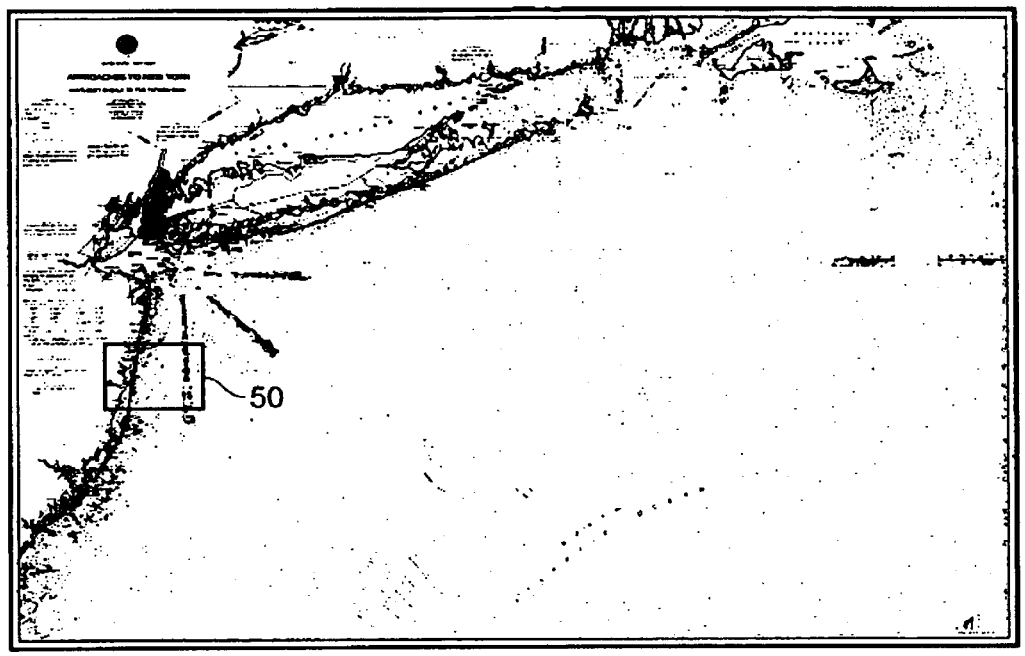
FIG. 1 shows an entire nautical chart, such as what is available in the prior art. An outline is provided to demonstrate the area 50, which can be viewed when zoom level is 100%.
Figure 2:
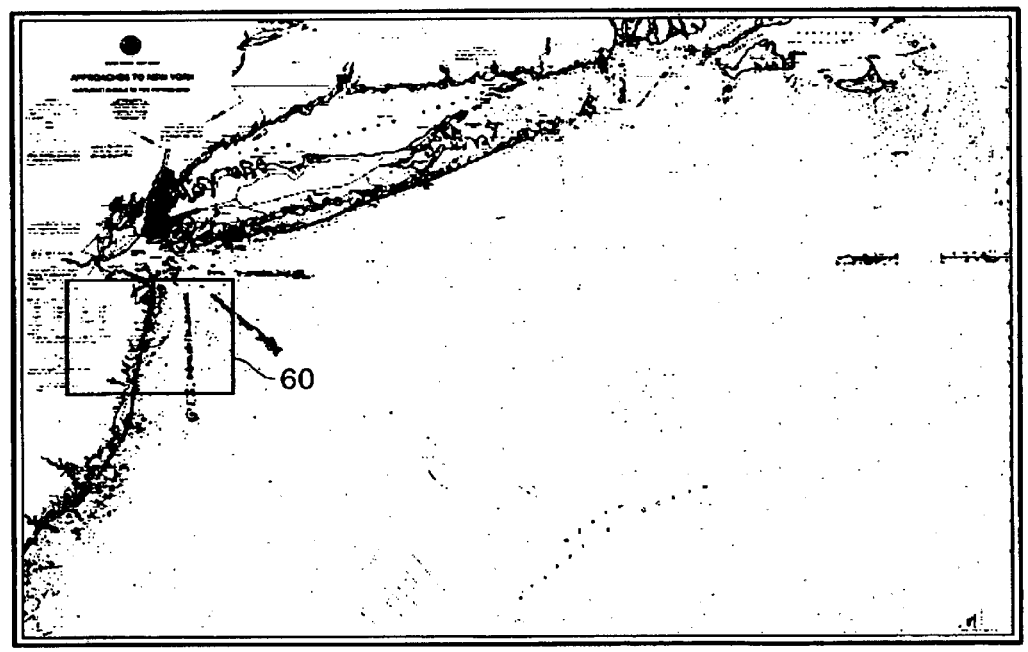
FIG. 2 shows an entire nautical chart, such as is available in the prior art. An outline is provided to demonstrate the area 60, which can be viewed in software when zoom level is 50%.
Figure 3:
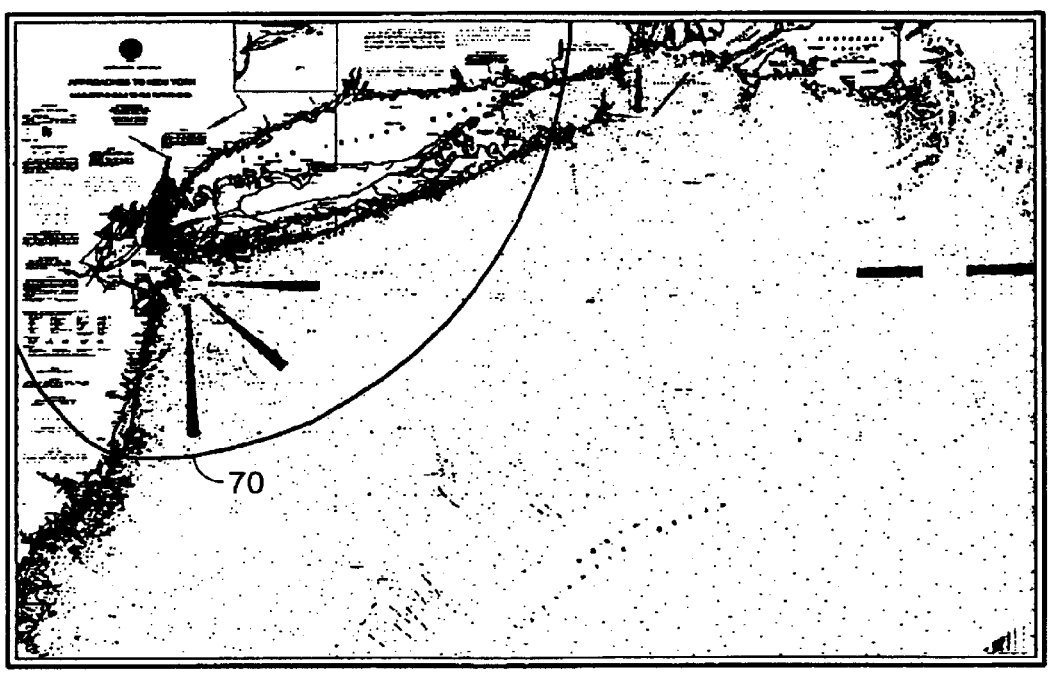
FIG. 3 shows an entire nautical chart, such as is available in the prior art. An outline is provided to demonstrate the area 70, which can be viewed using spherical view.
Figure 4:
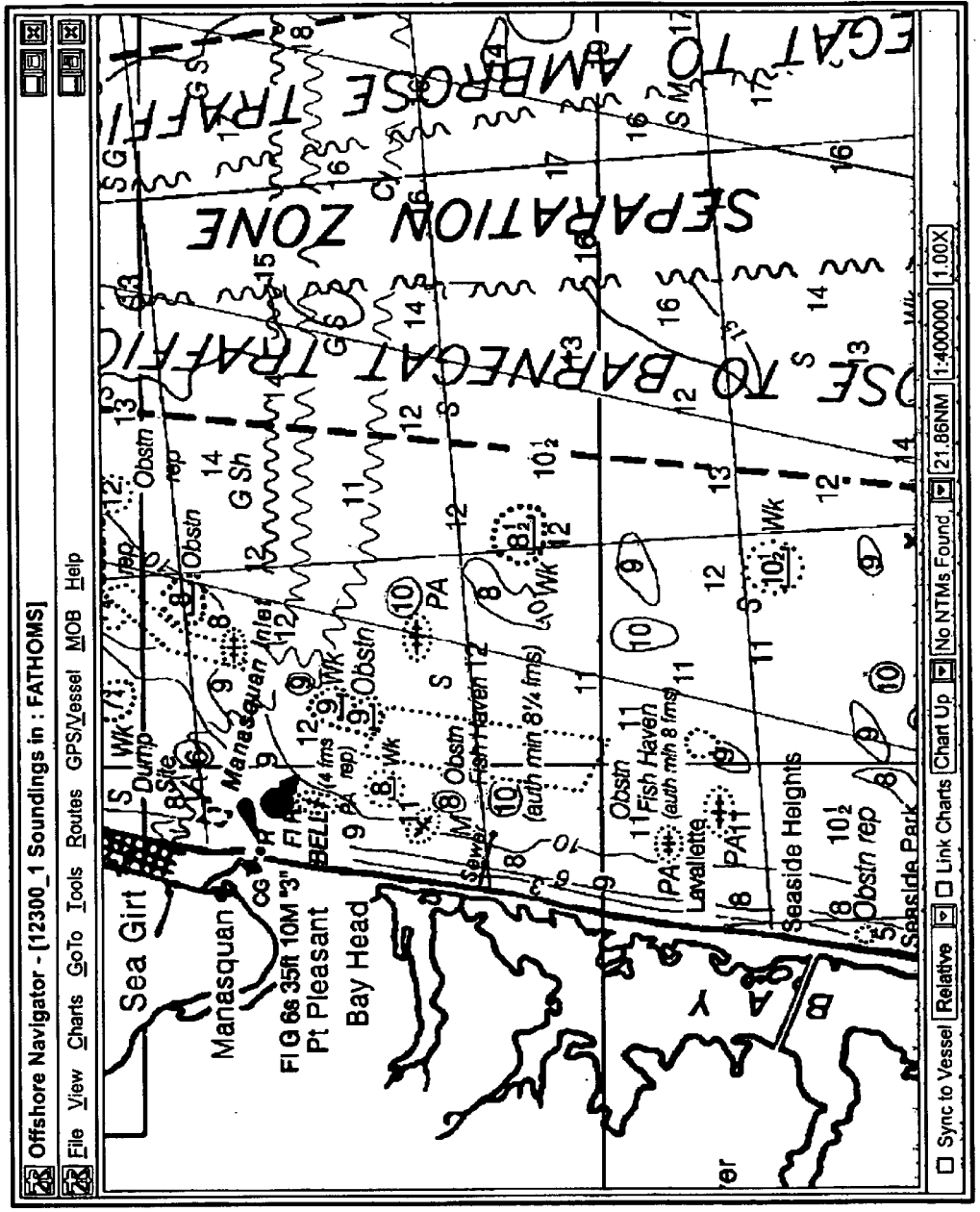
FIG. 4 shows the area 50 outlined in FIG. 1 displayed at 100% zoom.
Figure 5:
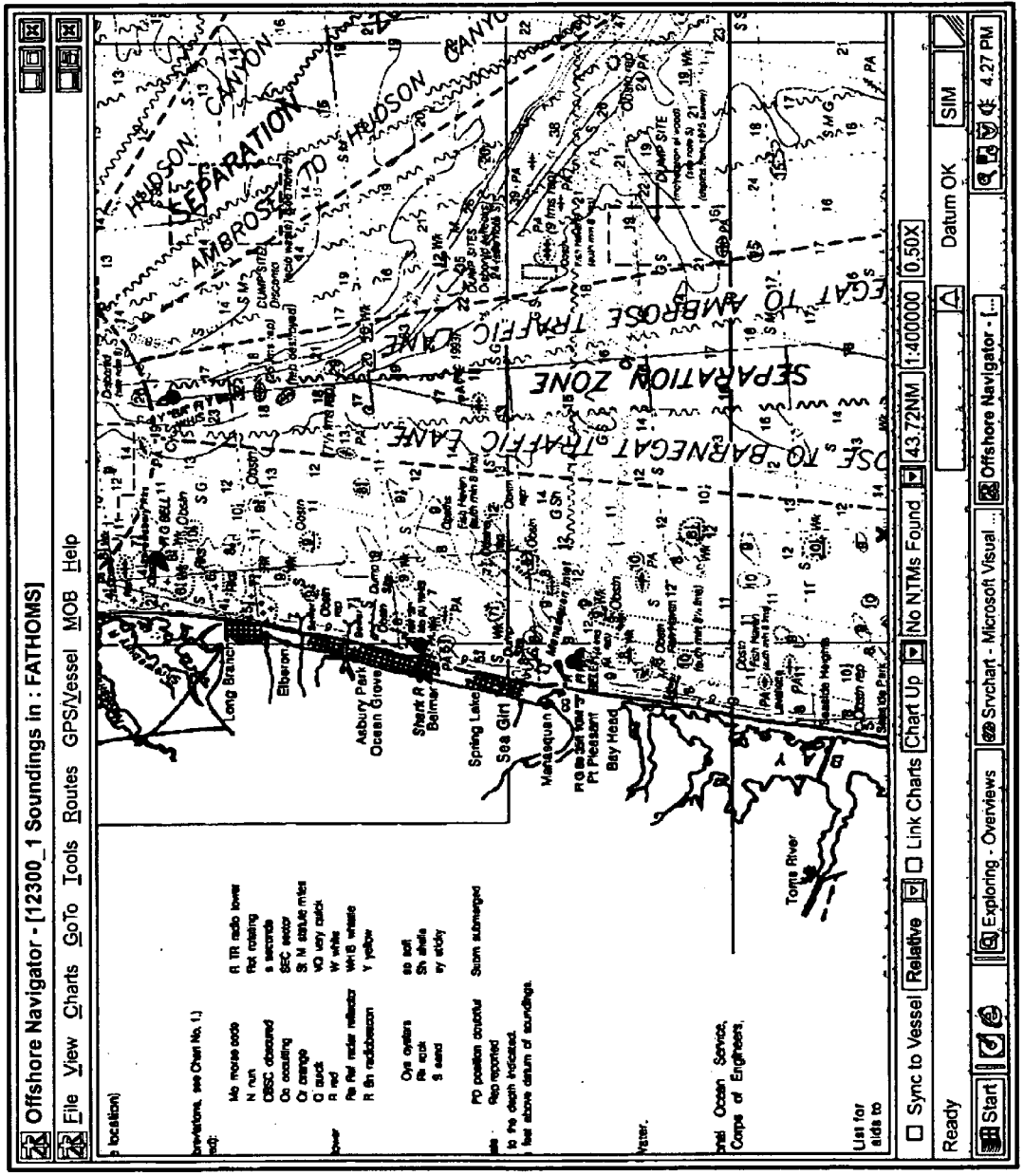
FIG. 5 shows the area 60 outlined in FIG. 2 displayed at 50% zoom.
Figure 6:
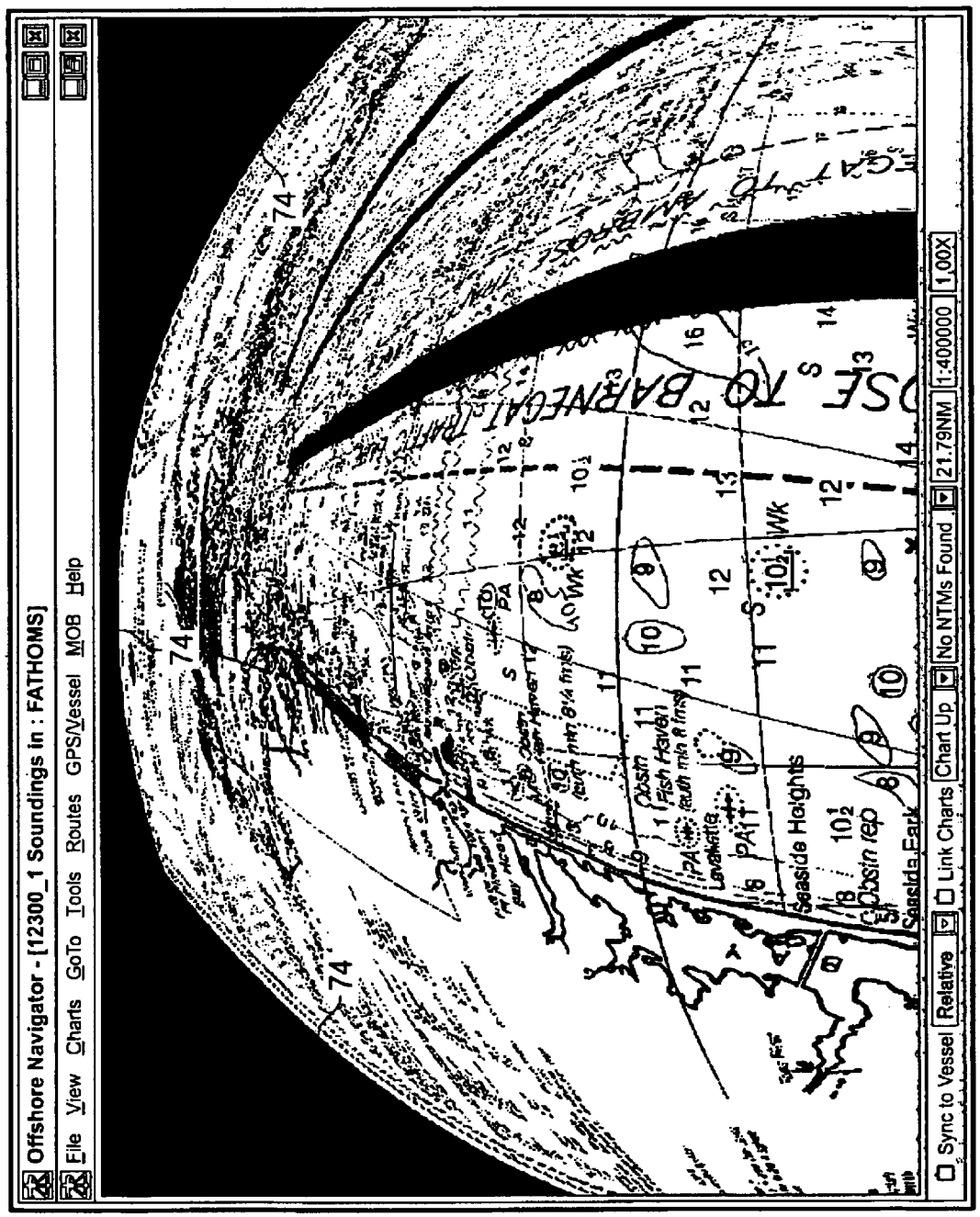
FIG. 6 shows the area 70 outlined in FIG. 3 displayed in spherical view. The area at the bottom of the chart is in 100% zoom, and as the distance increases from the bottom of the display the zoom decreases presenting the horizon effect 74 and providing both short term navigation and planning and long term navigation and planning.
Figure 8:
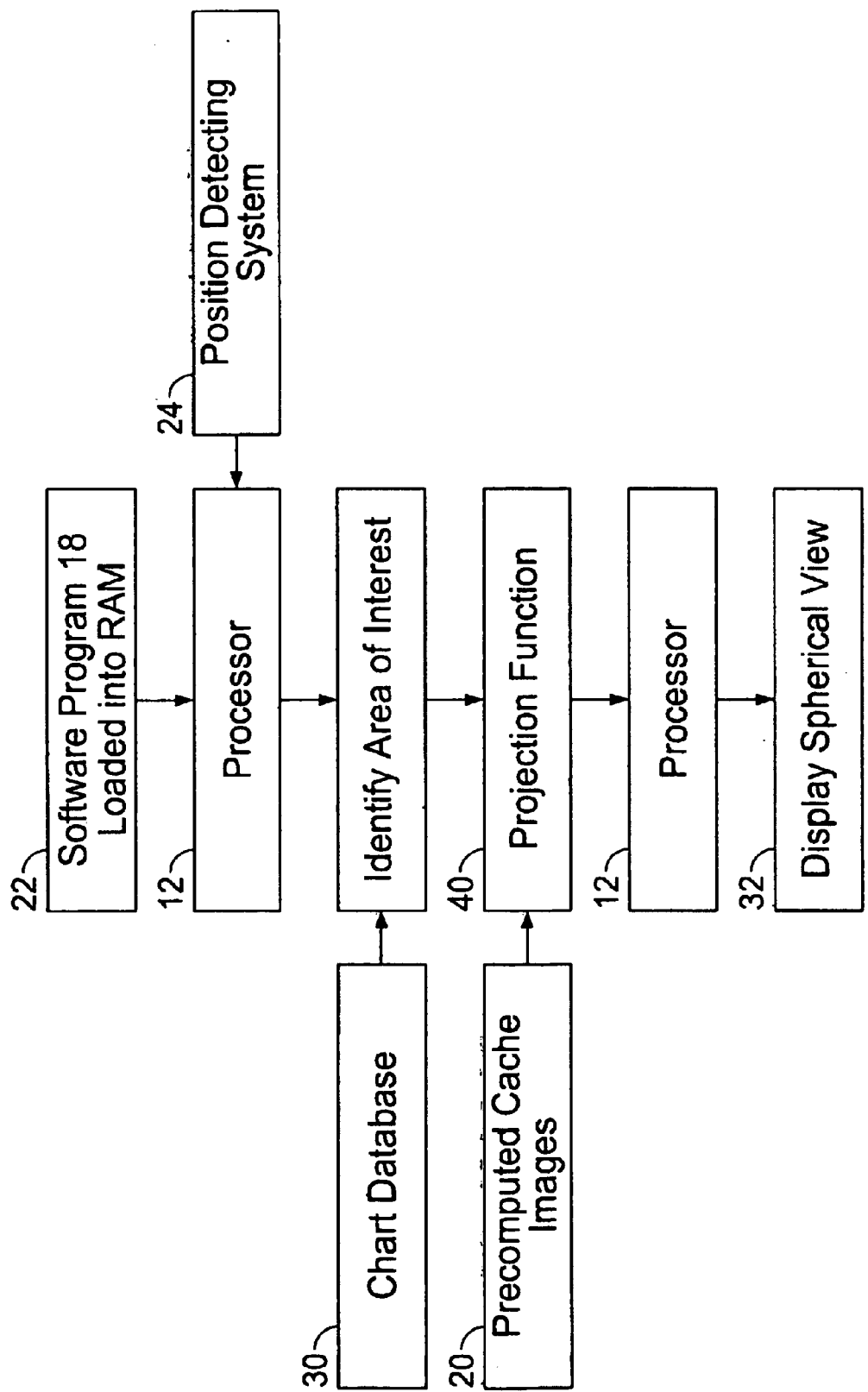
FIG. 8 is an operational flow chart of a comparative example of one of the preferred embodiments.

Referring to FIG. 8, in the navigation software program 18, the chart creation and display of the cache images is provided by a projection function 40 for switching cache images 20, which can be optionally stored in the storage medium 34 or in the memory storage device 16 from one to another and from source chart data to cache images and back again. FIG. 6 shows the spherical view and FIG. 3 shows the source chart data. The projection function 40 controls the displayed image by superimposing the cache images 20 the storage medium 34 or the memory storage device 16 on to the source chart data pixels selected from the chart database 30 and displays the cache images 20 on the screen of the display unit 32.

The projection function 40 first reads a plurality of source chart data having source pixels associated with the source chart data from the chart database 30 contained on the storage medium 34 and displays a chart on the screen of the display unit 32. The projection function 40 then applies a cache image 20, so that the selected cache image 20 is superimposed on the corresponding source chart data such that the source pixels of the source chart data that are not affected by the projection function 40 can be viewed simultaneously.

The projection function 40 functions, such that, all pixels that map from the unmodified source chart data to the display unit 32 are run through the projection function 40 and a new location on the display unit 32 is computed. Where pixels overlap, the overage of the overlapped pixels are displayed. For example, if a pixel is located 800 pixels from the origin (center of the area of interest) in the source chart data and the reduction function transforms that value to 100 pixels, the new pixel will be located 100 pixels form the origin on the display unit 32. If the pixel was located 1600 pixels from the origin and the reduction function transforms 1600 pixels to 150 pixels, that pixel would be located 150 pixels from the origin on the screen.

The main obstacle with implementing a reduction function without the present invention is the amount of data that contributes to the display of chart areas on the periphery of the screen display. Those areas near the area of interest are displayed at approximately 1:1 compared with the original chart database. Those areas on the periphery are reduced by a factor of as much as 20 or more, but still include all the detail of a 1:1 view. This can cause speed and memory problems because the amount of data that needs to be processed by the processor 12 to build a single screen is very large. On a display screen 32 that is 1024×768 resolution, one would never need to look at more than about 780,000 source pixels, however, at a 50% zoom the number of pixels is four times that. Thus, the spherical view, because of its "big picture" capability, requires the processing of a very large number of source chart data pixels. The screen remains 1024×768, but the information displayed covers a large portion of the chart. If the original chart is 12000×9000 pixels, the system must analyze as many as 54 million pixels.

Speed of chart drawing and display is crucial for navigation and mapping applications, therefore, the preferred embodiment utilizes the projection function 40 that reduces the processing required to update the spherical view screen. This allows the navigation system 10 to run in real time, updated continuously. The navigation system 10 employs the reduced resolution caches 20, either created "on the fly" or preloaded, of the original chart database 30 and then uses these caches 20 to produce the final displays. For example, in a preferred embodiment having a block of 128×128 pixels in the source chart database 30, the block maps to a single pixel on the display screen 32. If it is necessary to average the colors of all these pixels into the color of the single pixel, over 16,000 source chart data pixels must be processed to display a single pixel at the periphery of the screen image. However, in accordance with a preferred embodiment of the invention, a cache image which is $\frac{1}{8}$ the resolution of the original chart may be retrieved from the stored cache images 20. Therefore, there is no need to process a block of 128×128 pixels from the source chart database 30; instead, it is necessary to process a block of only 128/8×128/8 pixels, or 16×16, in the cache image. This, only 256 pixels need to be processed by a processor 12, allowing for greatly reduced computation times for each source image. As a further example, if the cache is $\frac{1}{64}$ size, a block of only 2×2 pixels in the cache needs to be processed. The computation of reduced block sizes through the use of the cache images 20 is much more efficient than processing the full block image from the source chart data. The cache images 20 can either be created on the fly and then stored on the memory storage device 16 or preloaded onto the chart database 30. Either technique reduces the number of pixels requiring processing by a processor 12 to a much more manageable size. The exact scale values used for the cache dimension are not important for the projection function 40, and, there is an infinite number of cache images 20 that can be used in accordance with the present invention. For example, $\frac{1}{2}$, $\frac{1}{4}$, $\frac{1}{8}$, $\frac{1}{16}$, or any other size caches can be created and used, depending upon the requirements of the specific application. In an alternate embodiment, an entire pyramid of cache images 20 can be used to ensure that there is no need for more than one cache pixel to be processed.

There are a variety of ways to determine from which cache image 20 the destination pixel colors should be drawn from. In one embodiment of the invention, the determination could be based on a fixed number of pixels (i.e., 100 pixels from the area of interest). In another embodiment of the invention, the determination could also be based on using the cache image 20, which requires the least amount of samples to produce a desired amount of anti-aliasing. For example, if 3×3 (9) pixels were required from the source image to represent the destination pixels color but would only require 1 pixel from a 33% reduced size cache, there would be no image quality advantage to using the source image but there would be a computational disadvantage. Furthermore, it would not be optimal to pull source colors from a cache image 20 which has insufficient resolution to hold the level of detail desired in displaying. If the destination screen pixel maps to one source pixel on the original chart, it is not optimal to sample that pixels color from a reduced size cache image 20, blurring or pixelation would occur in that case. Optimally, the source pixel is sampled from the cache image 20, which has a zoom level that most closely matches the zoom reduction factor found at the destination location. For example, if the reduction factor on a particular pixel was 50%, 100 pixels from the origin, optimally pixel from a 50% zoomed cache image 20 would be sampled. If two cache images 20, 25% and 50% existed, and a destination pixel existed that had a reduction factor of 40%, it is optimal to sample those pixels from the 50% cache image 20, sampling from the 25% percent cache image 20 would lead to unnecessary blurring.

In one embodiment of the invention, the screen image is processed in two passes, pass one processes the entire screen using the cache image as the source of all pixel colors. On pass two, taking advantage of the source tiles previously loaded from the original source image. When pixel data is loaded from a chart database 30, the data is divided into groups called tiles. Tiles generally have a size around 320 pixels wide by 240 pixels high. If the source chart database 30 was 11000 pixels by 9000 pixels, it would be composed of 11000/320*9000/240=1330 tiles. A box is defined based on the source tiles (2.5 tiles high by 5 tiles wide), and any screen pixels whose inverse projection falls within this box are rendered to the screen using the methods described below. Any screen pixels whose inverse projection falls outside this box are left alone. In this way tile caching is used and it decreases the time to render the same area (or close to the same area), repeatedly.

EXAMPLE 1

Creating an Image Cache

A chart for 10×10 pixels represented by the following array of colors c00 through c99:

| c00 | c01 | c02 | c03 | c04 | c05 | c06 | c07 | c08 | c09 |
| c10 | c11 | c12 | c13 | c14 | c15 | c16 | c17 | c18 | c19 |
| c20 | c21 | c22 | c23 | c24 | c25 | c26 | c27 | c28 | c29 |
| c30 | c31 | c32 | c33 | c34 | c35 | c36 | c37 | c38 | c39 |

-continued

| c40 | c41 | c42 | c43 | c44 | c45 | c46 | c47 | c48 | c49 |
| c50 | c51 | c52 | c53 | c54 | c55 | c56 | c57 | c58 | c59 |
| c60 | c61 | c62 | c63 | c64 | c65 | c66 | c67 | c68 | c69 |
| c70 | c71 | c72 | c73 | c74 | c75 | c76 | c77 | c78 | c79 |
| c80 | c81 | c82 | c83 | c84 | c85 | c86 | c87 | c88 | c89 |
| c90 | c91 | c92 | c93 | c94 | c95 | c96 | c97 | c98 | c99 |

There are many ways to create reduced image cache sizes, for example, ½ or ⅕ the average of the original colors that contribute to each pixel in the reduced resolution version. A simple box filter, which takes the mean of the overlapping pixels, is shown below. Cache image with ½ scale: 5×5 array of pixels whose values are computed as such.

$$
\begin{array}{ccccc}
\frac{(c00+c01)+(c10+c11)}{4} & \frac{(c02+c03)+(c12+c13)}{4} & \frac{(c04+c05)+(c14+c15)}{4} & \frac{(c06+c07)+(c16+c16)}{4} & \frac{(c08+c09)+(c18+c19)}{4} \\
\\
\frac{(c20+c21)+(c30+c31)}{4} & \frac{(c22+c23)+(c32+c33)}{4} & \frac{(c24+c25)+(c34+c35)}{4} & \frac{(c26+c27)+(c36+c37)}{4} & \frac{(c28+c29)+(c38+c39)}{4} \\
\\
\frac{(c40+c41)+(c50+c51)}{4} & \frac{(c42+c43)+(c52+c53)}{4} & \frac{(c44+c45)+(c54+c55)}{4} & \frac{(c46+c47)+(c56+c56)}{4} & \frac{(c48+c49)+(c58+c59)}{4} \\
\\
\frac{(c60+c61)+(c70+c71)}{4} & \frac{(c62+c63)+(c72+c73)}{4} & \frac{(c64+c65)+(c74+c75)}{4} & \frac{(c66+c67)+(c76+c77)}{4} & \frac{(c68+c69)+(c78+c79)}{4} \\
\\
\frac{(c80+c81)+(c90+c91)}{4} & \frac{(c82+c83)+(c92+c93)}{4} & \frac{(c84+c85)+(c94+c95)}{4} & \frac{(c86+c87)+(c96+c97)}{4} & \frac{(c88+c89)+(c98+c99)}{4} \\
\end{array}
$$

⅕ version: 2×2 array of pixels whose values are computed as such.

$$
\begin{array}{cc}
\frac{\begin{array}{c}c00+c01+c02+c03+c04 \\ + \\ c10+c11+c12+c13+c14 \\ + \\ c20+c21+c22+c23+c24 \\ + \\ c30+c31+c32+c33+c34 \\ + \\ c40+c41+c42+c43+c44\end{array}}{25} & \frac{\begin{array}{c}c05+c06+c07+c08+c09 \\ + \\ c15+c16+c17+c18+c19 \\ + \\ c25+c26+c27+c28+c29 \\ + \\ c35+c36+c37+c38+c39 \\ + \\ c45+c46+c47+c48+c49\end{array}}{25}
\end{array}
$$

-continued $$\frac{| c50 + c51 + c52 + c53 + c54 | \quad | c55 + c56 + c57 + c58 + c59 |}{| \quad + \quad | \quad | \quad + \quad |}$$
$$| c60 + c61 + c62 + c63 + c64 | \quad | c65 + c66 + c67 + c68 + c69 |$$
$$| \quad + \quad | \quad | \quad + \quad |$$
$$| c70 + c71 + c72 + c73 + c74 | \quad | c75 + c76 + c77 + c78 + c79 |$$
$$| \quad + \quad | \quad | \quad + \quad |$$
$$| c80 + c81 + c82 + c83 + c84 | \quad | c85 + c86 + c87 + c88 + c89 |$$
$$| \quad + \quad | \quad | \quad + \quad |$$
$$| c90 + c91 + c92 + c93 + c94 | \quad | c95 + c96 + c97 + c98 + c99 |$$
$$\overline{\qquad\qquad 25 \qquad\qquad} \quad \overline{\qquad\qquad 25 \qquad\qquad}$$

Once the cache images have been created, the projection function 40 works by looping through the screen display pixels from the chart database 30, computing the locations of the source chart data pixels (taking the inverse of the reduction function to find where the source pixels are) and then using the cache to compute the mean of all the source pixels. When the center of the screen display 32 changes (relative to the source chart database 30), the screen is updated using the same projection function 40 and the same cache 20.

EXAMPLE 2

Building a Screen Full of Data

Screen: 1024×768
Original image size: 1000000 by 1000000 (in pixels)
Number of caches: 1
Cache reduction: 1/256
Cache size ($1000000/256$ by $1000000/256$)=(3906 by 3906)
Forward reduction function: sqrt (distance) (in pixels)
Reverse reduction function: distance*distance (in pixels)
Projection origin: center of screen (1024/2,768/2)
Coordinates of upper left corner of screen: (−512,−384)
Coordinates of center of screen: (0,0)
Coordinates of lower right corner of screen: (+512,+384)
EXAMPLE

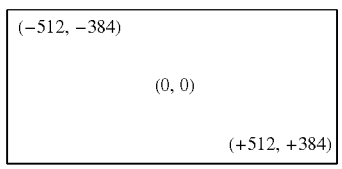

To compute the color of the pixel located at (−512,−384), the projection function 40 computes which of the source chart data pixels contributes to the color of the pixel of the destination pixel. To do this, the projection function 40 computes the mapping from the destination screen to the source screen. First, the corners of the destination pixel on the source pixels are found.
Corners of Destination Pixel
C1=(−512,−384) C2=(−512+1,−384)
C3=(−512,−384+1) C4=(−512+1,−384+1)
Compute the distance from the origin to the pixel corners:
Distance from (0,0) to C1 (on screen):
sqrt (−512*−512+−384*−384)
640 pixels
Distance from (0,0) to C2 (on screen):
sqrt (−511*−511+−384*−384)
639.2002 pixels
Distance from (0,0) to C3 (on screen):
sqrt (−512*−512+−383*−383)
639.4005 pixels
Distance from (0,0) to C4 (on screen):
sqrt (−511*−511+−383*−383)
638.6000 pixels
Process these distances through the reverse of the reduction function:
distance from (0,0) to C1 (in source image)=409600
distance from (0,0) to C2 (in source image)=408577
distance from (0,0) to C3 (in source image)=408833
distance from (0,0) to C4 (in source image)=407810
Calculate the coordinates of the source pixels:
C1 coordinates in source:
[sin(arc tan(512/384))*409600, cos(arc tan(512/384))*409600]
[327680, 245760]
C2 coordinates in source:
[sin(arc tan(511/384))*408577, cos(arc tan(511/384))*408577]
[326631.3438, 245452.9081]
C3 coordinates in source:
[sin(arc tan(512/383))*408833, cos(arc tan(512/383))*408833]
[327373.0562, 244890.3916]
C4 coordinates in source:
[sin(arc tan(511/383))*407810, cos(arc tan(511/383))*407810]
[326324.6160, 244583.8119]
The location of the destination pixel in the source coordinate system of the chart database 30 has now been calculated. Using the bounding box of these points in the source coordinate system, the following is found:
left~=327680
right~=326324
top~=245760
bottom~=244583
Take the size of this rectangle:
width=(327680−326324+1)=1357
height=(245760−244583+1)=1178
This is not the actual coverage in the source coordinate system of the chart database 30 (it has been approximated with a rectangle even though it is not a rectangle). The single destination pixel is composed of the average of (1357*1178)=1598546 pixels.
The next step in computing the destination pixel color is to use the image cache to get the mean of approximately 1.6 million pixels. The scale reduction for the cache is 1/256 to convert from the source pixel coordinate system to the cache coordinate system.
The source pixels are:
C1~=[327680, 245760]
C2~=[326631, 245452]
C3~=[327373, 244890]
C4~=[326324, 244583]
Mapping to the cache coordinate system:
C1~=[327680/256, 245760/256]
C2~=[326631/256, 245452/256]
C3~=[327373/256, 244890/256]
C4~=[326324/256, 244583/256]
Which equals (after truncating the decimal):
C1~=[1280, 960]
C2~=[1275, 958]
C3~=[1278, 956]
C4~=[1274, 955]
The bounding box of this rectangle is:

left=1280
right=1274
top=960
bottom=955
And the size is:
width=1280−1274+1=7
height=960−955+1=6
Compute the mean of the following 42 pixels:

| [1280,960] | [1279,960] | [1278,960] | [1277,960] | [1276,960] | [1275,960] | [1274,960] |
| [1280,959] | [1279,959] | [1278,959] | [1277,959] | [1276,959] | [1275,959] | [1274,959] |
| [1280,958] | [1279,958] | [1278,958] | [1277,958] | [1276,958] | [1275,958] | [1274,958] |
| [1280,957] | [1279,957] | [1278,957] | [1277,957] | [1276,957] | [1275,957] | [1274,957] |
| [1280,956] | [1279,956] | [1278,956] | [1277,956] | [1276,956] | [1275,956] | [1274,956] |
| [1280,955] | [1279,955] | [1278,955] | [1277,955] | [1276,955] | [1275,955] | [1274,955] |

This example shows the algorithm to create a cache image 20 for a single pixel. To update the entire screen, the algorithm is applied to all pixels in the destination screen and run through the projection function 40.

EXAMPLE 3

Building a Screen of Data

A $1/1024$ scale cache can be used in place of the $1/256$ cache as follows:
Mapping to the cache coordinate system:
C1~=[327680/1024, 245760/1024]
C2~=[326631/1024, 245452/1024]
C3~=[327373/1024, 244890/1024]
C4~=[326324/1024, 244583/1024]
Which equals (after truncating the decimal):
C1~=[320, 240]
C2~=[318, 239]
C3~=[319, 239]
C4~=[318, 238]
The bounding box of this rectangle is:
left=320
right=318
top=238
bottom=239
And the size is:
width=320−318+1=3
height=239−238+1=2
Compute the mean of the following 6 pixels:
[320,239] [319,239] [318,239]
[320,238] [319,238] [318,238]

Compared to raster manipulation described above, the display of overlays and vector information on the displayed charts can be processed much faster. This applies to both overlays and entire vector charts displayed on the display screen 32. All vector overlays can be broken down into line and point primitives. These primitives can have their coordinates run through the same reduction functions used for the pixel locations. In the case of point objects, there is one calculation to map to a new location. In the case of line primitives, it is necessary to map not only the start and end points, but also the intermediate points since straight lines will be curved by the spherical view projection unless the line originates from the center of the projection. Once the intermediate points have been computed, the line can be plotted to match the projection used on the raster charts.

EXAMPLE 4

Mapping a Vector Point Object

Using the sample example parameters as listed above, if an icon is to be plotted on the screen display 32 and that icon is located 1000 pixels below the point of interest (on the source chart database 30) and 500 pixels to the right of the point of interest (again, on the source chart database 30) to calculate where to place the icon on the screen:
Distance from point of interest to icon:
sqrt(1000*1000+500*500)~=1118 pixels away.
The distance gets adjusted by the reduction function to be:
sqrt(1118)=33.4 pixels away.

The angle (and now the distance) to the icon on the screen display 32 is now known, so now compute the offset from the point of interest:

delta x=sin(arc tan(1000/1118))*33.4=22.3 delta y=cos(arc tan(1000/1118))*33.4=24.9

If the point of interest is located at the center of the screen 32 (512,384), then the icon should be placed at:

512+22.3=534

384+24.9=408

[534,408]

EXAMPLE 5

Mapping a Vector Line Object

Using the example parameters listed in the vector point example, to draw a line from [500,1000] to [700, 400] on the source chart relative to the center of the projection, the projection function 40 breaks the line down into shorter line segments and then computes the location of the segments using the same algorithm used in the point example. The number of segments created is based on the desired accuracy. This example breaks the vector line object into 10 segments.
0% distance from [500,1000] to [700, 400]=[500, 1000]
10% distance from [500,1000] to [700, 400]=[520, 940]
20% distance from [500,1000] to [700, 400]=[540, 880]
30% distance from [500,1000] to [700, 400]=[560, 820]
40% distance from [500,1000] to [700, 400]=[580, 760]
50% distance from [500,1000] to [700, 400]=[600, 700]
60% distance from [500,1000] to [700, 400]=[620, 640]
70% distance from [500,1000] to [700, 400]=[640, 580]
80% distance from [500,1000] to [700, 400]=[660, 520]
90% distance from [500,1000] to [700, 400]=[680, 460]
100% distance from [500,1000] to [700, 400]=[700, 400]
The projection function 40 converts each of the 11 points using the method described above to convert a vector point, and then determines where to draw the line segments on the destination screen 32.

EXAMPLE 6

Enhancement 1
When building a screen to display to the user, a reduced size cache is used as well as the original image. In order to bound the size of the cache that will be taken up on the users disk (as well as in memory), the cache is built based on final total size. For example, if the original chart was of a dimension 11417 by 9518 (4-bit), that image would take 51 Mb of memory/disk space (uncompressed). The bounds are set to be 4 Mb (8-bit, uncompressed) so the cache image for this example chart would be:

11417x*9518x=4 Mb
$x^2$*(11417*9518)=4 Mb
x=0.196463
2243*1869

This sets an upper bound on the amount of extra memory and disk space needed for the cache images.

Enhancement 2

In order to show the image in real-time while the user is dragging it, first a screen image is created using only the cache as a source. After creating the original screen image from the cache image 20, the system goes back and uses data from the original source chart database 30 to improve the look of the image which is near the center of the projection. This allows the image to be drawn quickly while the user is moving the area of interest quickly from place to place (i.e., scrolling the chart), and then show a final higher quality image on a display unit 32 when the final image is desired. The area of the display unit 32 that is updated with a second, higher quality pass is based on a simple distance cutoff function (centered around the area of interest).

Enhancement 3

In order to speed up the processing of creating the final screen-image, a step was added that allows the system to compute the mappings from chart database 30 to display unit 32 and display unit 32 to chart database 30 at higher speeds. The process of going between these coordinate systems uses the reduction function on every pixel of the screen image. If the reduction function is computationally expensive, this can cause a bottleneck in processing speed. This problem is solved by only calling the reduction function for every $16^{th}$ pixel on the screen, and using linear interpolation to compute an approximation of the reduction function for the other pixels. To state this in another way, the source pixel location is computed for screen location (x,y) and then the source pixel location is computed for screen pixel (x−16, y). Then the projection function can fill the screen line (x,y) to (x+16, y) with the pixels located between the two source locations that were computed. The pixels are located by assuming that they are in a straight line between the two source locations. This approximation was empirically found to have a negligible effect on quality.

Enhancement 4

The application supports both image zooming and image rotation. These are just two more affine transformation functions that are merged with the distance reduction function to find the proper source pixels.

Enhancement 5

Mathematically, each pixel on the display unit 32 will be mapped onto (or may cover) more then one pixel on the chart database 32. In an idealized version of this algorithm, the final color of each output pixel would consist of a color contribution from all covered source pixels. Even with caching, this would be computationally difficult. A simple box filter is used to compute an average of the pixels at the source location and this value is used as the color of the output pixel. The contributions of most other pixels will be introduced through the use of the image cache.

Building a full screen of data consists of two major steps:
1) Building the "distant" part of the image from the cache image 20.
2) Building the "near" part of the image from the chart database 30.

The main difference between these two steps is the source of input pixels. In building the near, the pixels are obtained directly from the chart database 30, and in building the distant the pixels are obtained from the cache images 20. Since each pixel from the chart database 30 is mapped into one pixel on the cache images 20, the algorithm for both steps is almost identical.

Example:

The part of the screen to fill is of size: 1020×717

The original image size is: 11417×9518

Number of cache images 20: 1

Cache reduction amount is: 0.196463 (approx. $\frac{1}{5}^{th}$)

Cache size (11417/5 by 9518/5)=(2283 by 1903)

The location where the vessel is displayed on the display unit 32 is the center of the spherical projection. For this example, a coordinate system is defined on the screen where this point is located at coordinates (0, 0). Using the "Look ahead" mode of operation this point appears at the bottom/center of the display unit 32. The screen coordinates of the upper left screen corner are, therefore, (−1020/2, −717), and the screen coordinate of the bottom right screen corner are (1020/2, 0)

The chart database 30 coordinate system will be defined as follows. The upper left corner of the chart database 30 will have coordinates (0,0) and the bottom right corner of the chart will have coordinates (11417, 9518)

To build a full screen of data, the coordinates of the source (chart/cache) pixel are determined for each screen pixel which is being mapped. The first step is to determine where the center of the screen projection is going to be on the source chart database 30. This location would generally be determined by the user but is most often going to be the user's vessel location on the source chart database 30. It need not necessarily be the vessel location since the user could scroll away from the vessel in order to view another section of the chart database 30 in better detail. For this example the center of the projection is mapped to the point (1250, 1561).

In the navigation software program 18, the user controls options for chart zoom level and chart rotation. In this example values of 50% zoom and 15 degree chart rotation are used.

The process of building a screen image can be broken down into the process of computing each one of the screen lines in sequence. The process of computing the value of one line on the screen can in turn be broken down into the process of computing the value of each 16-pixel segment of each line.

To process one segment, first the coordinates of each segment's starting and ending points are calculated. In this example the screen segment which runs from screen coordinates is (−414,−317) to (−398,−317).

First the distance from the center of projection to the start pixel (on screen) is calculated.

$$\text{Distance}=\text{sqrt}((-414*-414)+(-317*-317))=521.425$$

Next the distance is calculated from the center of projection to the end pixel (again on screen).

$$\text{Distance}=\text{sqrt}(((-398)*(-398))+(-317*-317))=508.815$$

Next the reduction function is applied in order to find the source pixels for the start and end segments point.

The reduction function chosen is defined as follows:

$$Mp(D)=\text{Rotate}(Fp(D))*\text{ChartZoom}*\text{CacheReduction}+\text{CentProj}$$

Where

Rotate is a rotation function, (15 degree rotation)
Rotation is defined as:

$$x\_rot = x * \cos(angle) - y * \sin(angle)$$

$$y\_rot = x * \sin(angle)) + y * \cos(angle)$$

x and y are the original coordinates of the pixel p, and x_rot and y_rot are the rotated coordinates of the pixel p.
Fp(D) is the reverse/inverse reduction function,
ChartZoom is the selected zoom level (i.e., 0.5)
CacheReduction is the cache reduction zoom level (i.e., ⅕)
CentProj is the coordinates of the position of the center of the projection in chart coordinates (i.e., (1250, 1561)
For each individual screen pixel p the reverse/inverse reduction function is defined as:

$$Fp(D) = Zp(D) * D$$

Where:
D is the distance from the center of projection to the screen pixel p.
Fp is the forward reduction function.
Zp (D) is the zoom coefficient for pixel p.
The Zoom coefficient for pixel p is calculated as follows:

$$Zp = \text{power}(2,(8*(\text{power}((D)/MD, 4))))$$

Where:
MD is the maximum possible screen distance. The distance from (0,0) to a corner. The particular zoom coefficient that was chosen was designed to ensure that the chart will be displayed on-screen in close to its entirety when the user-chosen zoom level was set to 100%. This function was arrived at through examination of general chart sizes as well as attempting to get a ⅛$^{th}$ reduction factor at the most distant pixels on the chart. Another way of saying this is that the function as a value of 1.00 at the center of the projection and ⅛ at the maximum distance from the center of the projection.

Now, returning to the reduction function, the maximum distance is computed (in screen coordinates):

$$MD = \text{sqrt}((-717)*(-717)+(510)*(510)) = 879.8801$$

Next compute the zoom coefficient for the start pixel:

$$Zp(D1) = \text{pow}(2,(8*\text{pow}((521.425)/879.8801),4))) = 1.981588$$

Next compute the zoom coefficient for the end pixel:

$$Zp(D2) = \text{pow}(2,(8*\text{pow}((508.815)/879.8801), 4))) = 1.859114$$

Next compute the rotated coordinates of the start pixel:

Rotate ([-414,-317],15)=(-318, -413):

$$-318 = -414 * \cos(15) - (-317) * \sin(15)$$

$$-413 = -414 * \sin(15) - (-317) * \cos(15)$$

Next compute the rotated coordinates of the end pixel:

Rotate ([-398, -317],15)=(-302, -409)

$$-302 = -398 * \cos(15) - (-317) * \sin(15)$$

$$-409 = -398 * \sin(15) - (-317) * \cos(15)$$

Next apply the cache reduction and chart zoom to the start pixel:

$$[-252, -327] = [-318*1.981588/0.5*⅕, -413*1.981588/0.5*⅕]$$

Next apply the cache reduction and chart zoom to the end pixel:

$$[-224, -304] = [-302*1.859114/0.5*⅕, -409*1.859114/0.5*⅕]$$

In order to use linear interpolation between the start and end points of the source image, a linear increment is computed which will result in 16 points between the start and end points. The linear increments are computed as follows:

$$dx = (-252-(-224))/16 = 1.75$$

$$dy = (-327-(-304))/16 = 1.4375$$

Next the start pixel location is offset using the viewing origin (in chart coordinates), to compute the location of the start pixel in the source/cache coordinate system:

$$[-252+1250, -327+1561] = [998, 1234]$$

And finally, for the remaining pixels in the segment, the linear increment is added to find the source coordinates of the remaining 15 pixels.

[~998 ~1234]
[~999 ~1235]
[~1001 ~1236]
[~1003 ~1238]
[~1005 ~1239]
[~1006 ~1241]
[~1008 ~1242]
[~1010 ~1244]
[~1012 ~1245]
[~1013 ~1246]
[~1015 ~1248]
[~1017 ~1249]
[~1019 ~1251]
[~1020 ~1252]
[~1022 ~1254]
[~1024 ~1255]

The locations are identified for all source pixels and the color contents are copied from the source chart or cache to the final screen location.
When all segments in all lines have been processed using the projection function as described above, the screen image is complete.

EXAMPLE 7

Performing Spherical Projection With No Cache:

It is possible to build screen images using the spherical projection without using any additional cache buffers. The source coordinates of a screen pixel may cover many source pixels in the original chart, however, it is not required to utilize the contribution of each source pixel in the destination screen pixel. If instead of pulling source pixels from the cache a single source pixel (or sample a limited collection of source pixels) was pulled from the original image, an output image could still be produced at high speeds. The point of the cache buffers is to improve the level of quality of the output, and cache buffers are not required to produce an image.

EXAMPLE 8

If the original image had been stored or converted to a resolution independent format (like Wavelet compression), it would be very easy to use the lower frequency color components as the source for the color sampling. Knowing that the screen pixel covered a very large area of the source chart, the low frequency data could be sampled, if the screen pixel mapped to very few pixels (i.e., near the area of interest), the higher frequency components could then be sampled. In principle, this is no different than sampling from a store of cache images 20, but the wavelet file could be precomputed and exist as a single (and highly compressed) file.

Although the invention has been described with respect to specific embodiments and examples, it should be appreciated that other embodiments utilizing the concept of the present invention are possible without departing from the scope of the invention. The claimed elements, and any and all modifications, variations or equivalents that fall within the true spirit and scope of the underlying principles define the present invention.

What is claimed is:

1. A method for providing navigational information, the method comprising:
   reading images of source chart data pixels corresponding to a source chart database;
   determining a location of an area of interest in relation to the source chart database information;
   reading cache images of less resolution (scale) than those corresponding to the source chart data pixels;
   using a projection function that loops through source chart data pixels computing their locations and the locations of the corresponding cache images; and
   displaying the source chart data pixels in a close proximity to the area of interest and displaying the cache images in the more distant areas.

2. A method for providing navigational information, the method comprising:
   reading images of source chart data pixels corresponding to a source chart database;
   determining a location of a user in relation to the source chart database information using a position detecting system;
   reading cache images of less resolution (scale) than those corresponding to the source chart data pixels;
   using a projection function that loops through source chart data pixels computing their locations and the locations of the corresponding cache images; and
   displaying the source chart data pixels in a close proximity to the area of interest and displaying the cache images in the more distant areas.

3. A storage memory device containing a program for providing a spherical view of an electronic chart comprising the steps of:
   reading images of source chart data pixels corresponding to a source chart database;
   determining a location of an area of interest in relation to the source chart database information;
   reading cache images stored on the memory storage device of less resolution (scale) than those corresponding to the source chart data pixels;
   using a projection function stored on the memory storage device that loops through source chart data pixels computing their locations and the locations of the corresponding cache images; and
   displaying the source chart data pixels in a close proximity to the area of interest and displaying the cache images in the more distant areas.

4. A storage memory device containing a program for providing a spherical view of an electronic chart comprising the steps of:
   reading images of source chart data pixels corresponding to a source chart database;
   determining a location of a user in relation to the source chart database information using a position detecting system;
   reading cache images stored on the memory storage device of less resolution (scale) than those corresponding to the source chart data pixels;
   using a projection function stored on the memory storage device that loops through source chart data pixels computing their locations and the locations of the corresponding cache images; and
   displaying the source chart data pixels in a close proximity to the area of interest and displaying the cache images in the more distant areas.

5. The storage memory device of claim 4, wherein the cache images are of different scales.

6. The storage memory device of claim 5, wherein the projection function chooses cache images based on a predetermined number of pixels the corresponding source pixel is located from the user.

7. The storage memory device of claim 6, wherein the projection function selects different scale cache images based on the number of pixels the corresponding source pixels are located from the user.

8. A navigation system comprising:
   a storage medium for storing chart databases, such that each location on the chart corresponds to source chart data pixels;
   a plurality of cache images, corresponding to the stored source chart data pixels, capable of being stored in a memory storage device;
   a projection function for switching cache images stored in a memory storage device from one to another and from source chart data pixels to cache images and back again; and
   a processor for controlling the displayed image by superimposing the cache images on to the source chart data pixels displayed on a screen of a display unit in accordance with a preselected area of interest;
   wherein the source chart data pixels corresponding to the area of interest are displayed at a higher resolution than the cache images corresponding to an area that is not the area of interest.

9. A navigation system comprising:
   a storage medium for storing chart databases, such that each location on the chart corresponds to source chart data pixels;
   a plurality of cache images, corresponding to the stored source chart data pixels, capable of being stored in a memory storage device;
   a projection function for switching cache images stored in a memory storage device from one to another and from source chart data pixels to cache images and back again; and
   a processor for controlling the displayed image by superimposing the cache images on to the source chart data pixels displayed on a screen of a display unit in accordance with a location of a user determined by using a position detecting system;
   wherein the source chart data pixels corresponding to the area of interest are displayed at a higher resolution than the cache images corresponding to an area that is not the area of interest.

10. A navigation system for providing a spherical view of an electronic chart comprising:

a storage memory device for storing a navigation software program;

a storage medium for storing chart database and;

RAM;

display unit;

chart database having chart data corresponding to a source pixel when displayed;

cache images having reduced scale and corresponding to the stored source pixels of the chart database capable of being stored in a storage memory device;

projection function for selecting one of the cache images stored in the storage memory device;

a processor that uses the projection function to read the source chart data in accordance with a selected area of interest; controls the read source chart data to be displayed on a screen of the display unit in accordance with the projection function; and further reads the selected cache images from the storage memory device in accordance with the projection function, thereby superimposing the selected scale cache image on the displayed chart;

wherein the area of interest is displayed at a higher resolution than the cache images corresponding to an area that is not the area of interest.

11. A navigation system for providing a spherical view of an electronic chart comprising:

a storage memory device for storing a navigation software program;

a storage medium for storing chart database and;

RAM;

display unit;

a position detecting system for detecting a current position;

the chart database having chart data corresponding to a source pixel when displayed on the display unit;

cache images having reduced scale and corresponding to the stored source pixels of the chart database capable of being stored in the storage memory device or storage medium;

projection function for selecting one of the cache images stored in the storage memory device;

a processor that uses the projection function to read the chart data in accordance with the current position of the user detected by the position detecting system, controls the read chart data to be displayed on a screen of the display unit in accordance with the projection function and further reads the selected cache images from the storage memory device in accordance with the projection function, thereby superimposing the selected scale cache image on the displayed chart;

wherein the area of interest is displayed at a higher resolution than the cache images corresponding to an area that is not the area of interest.

* * * * *